March 28, 1967     H. DITTMANN ETAL     3,311,507
MULTIPLE LAYER ELECTRODE

Filed April 26, 1962     2 Sheets-Sheet 1

INVENTORS:
HEINER DITTMANN, HORST GRÜNE, EDUARD JUSTI & AUGUST WINSEL
By Burgess Dinklage & Sprung
ATTORNEYS March 28, 1967  H. DITTMANN ETAL  3,311,507
MULTIPLE LAYER ELECTRODE
Filed April 26, 1962  2 Sheets-Sheet 2

INVENTORS:
HEINER DITTMANN, HORST GRÜNE, EDUARD JUSTI & AUGUST WINSEL
By Burgess, Dinklage & Sprung
ATTORNEYS

United States Patent Office

3,311,507
Patented Mar. 28, 1967

3,311,507
MULTIPLE LAYER ELECTRODE
Heiner Dittmann, Horst Grüne, Eduard Justi, and August Winsel, all of Braunschweig, Germany, assignors to Varta Aktiengesellschaft, Hagen, Westphalia, and Siemens-Schuckertwerke Aktiengesellschaft, Berlin and Erlangen, Germany
Filed Apr. 26, 1962, Ser. No. 208,153
Claims priority, application Germany, Apr. 29, 1961, R 30,226
17 Claims. (Cl. 136—120)

The present invention relates to a multiple layer electrode, and more particularly to a multiple layer gas diffusion electrode having a central porous gas diffusion layer portion, an intermediate catalytically active porous working layer portion, and a peripheral surface layer portion having an average pore radius which is smaller than that of the working layer portion.

In copending U.S. application Ser. No. 826,812, now Patent No. 3,201,282, filed July 13, 1959, gas diffusion electrodes are disclosed which have a fine-pored surface layer and a coarse-pored catalytic working layer supplied with gas, which are referred to as valve electrodes, such electrodes being usable in electrochemical devices in which gases are consumed or developed, i.e., especially for use in fuel cells and electrolyzers. These electrodes may have a double-skeleton catalyst structure and may be prepared in a manner somewhat generally disclosed in U.S. 2,928,891, issued Mar. 15, 1960.

Where such valve electrodes are used in fuel cells to obtain electrical energy by the direct conversion of fuel gases with oxidizing gases, the reacting gases must be conducted to the catalytically active porous layer with a pressure of about 1–2.5 atmospheres excess pressure (gage). To render this possible, the electrode body itself must be imbedded in a mounting in a gas-tight manner, usually in a wall opening separating the liquid electrolyte from the gas space. Thus, the electrode body is secured in a gas-tight manner along its edges to the corresponding opening on the wall of the device being used. For the purposes of such an electrode, it is sufficient to place the electrode in a gas-tight manner in a mounting frame in turn secured to the wall, where such mounting frame is made of synthetic resin material such as a plastic, i.e., an acrylate, polyethylene, and the like. The gas space in such a device communicates with the working layer portion of the electrode while the electrolyte space communicates with the surface layer portion of the electrode, the gas space being supplied with the desired gas from a source connected therewith.

Unfortunately, a valve electrode constructed in the foregoing manner, especially for use in fuel cell operations, is subject to the following disadvantages:

(1) The desired diffusion of gaseous material in the electrode is only able to take place on one side or face, since the electrode body represents a partition between the electrolyte space and the gas space.

(2) Since these valve electrodes are prepared in thin sheet form so that the same may serve as a membrane-like covering interposed between the electrolyte space and the gas space, gas pressure in the gas space could not be maintained as high as desired or otherwise the fixed electrode plates or membranes would break upon exceeding an upper pressure limit.

(3) By reason of the fact that synthetic resin or rubber packing materials were used for mounting the electrode sheet or plate as a partition wall between the electrolyte space and the gas space, the operating temperature to which the electrodes could be subjected was required to be maintained considerably below 100° C. in order to avoid destroying such synthetic or rubber packing materials by contact with the electrolyte. Since load-capacity and polarization, especially of double-skeleton catalyst electrodes, improve considerably with increasing temperature, a factor which is of special importance for the oxidation of methane, a significantly high operating temperature has not been able to be utilized previously, even in connection with cell devices containing valve electrodes, because of the technical difficulties involved. Therefore, the operation of fuel cells working with such valve electrodes must be considered comparatively uneconomical.

Generally, electrodes of the so-called valve electrode type may be used for the electrochemical conversion of liquid fuel materials in fuel cells with the formation of a gaseous component, and for most efficient service these electrodes consist of a catalytically active, coarse-pored working layer which is completely covered on the side facing the liquid electrolyte with a fine-pored surface layer which permits seepage of liquid electrolyte inwardly only as far as the boundary between the fine-pored surface layer and the coarse-pored working layer due to the gas pressure in the coarse-pored working layer. Such gas pressure is usually maintained high enough to offset the capillary pressure of the liquid electrolyte in the fine-pored surface layer and the pressure in the electrolyte space, such gas, however, being prevented from bubbling through the valve electrode into the liquid electrolyte due to the fact that the surface layer is provided with pores too fine for this to occur under the conditions used.

In copending U.S. application Ser. No. 28,475, now Patent No. 3,256,163, filed May 11, 1960, a separating column for obtaining deuterium-rich water is disclosed which includes an electrolytic cell for the decomposition of water as well as several enrichment or concentration cells, each having both a hydrogen anode and a hydrogen cathode, whereby to obtain the heavy water.

The above-described electrodes have not been used previously for the electrochemical conversion of gaseous combustible materials in fuel cells, due to the fact that generally fuel cells are operated for the most part with gases which possess only a technical degree of purity. An important factor is that the inert gas mixtures which pass into the electrode must be removed constantly in order to prevent the suffocation of the electrode and the decline of fuel cell operation. For this purpose the technically pure combustible gaseous material passes into the electrode through a suction intake in turn reaching the active catalyst areas where the three phase interface of electrolyte, catalyst and gas is located, and the unreacted inert gas which remains is discharged through an exhaust outlet.

It will be appreciated that operation of the above-described electrodes for the electrochemical conversion of gaseous materials in fuel cells is beset with the danger that the inert gases which are present in the technically pure fuel gas will accumulate in the operating layer before the three phase interface and tend to disturb undesirably the overall cell operation. Actually, the inert gas will not be reacted, yet will, by its very presence, prevent complete and efficient contact in the desired manner between the liquid electrolyte and the combustible fuel gas constituents on the electrode catalyst surface. In copending U.S. application Ser. No. 125,268, filed July 19, 1961, now Patent No. 3,256,116, a procedure is disclosed which seeks to avoid the objectional characteristics attendant with fuel cell operations using inert gas mixtures with combustible fuel gas, i.e. gaseous materials having only a technical degree of purity.

It is an object of the present invention to overcome the aforementioned disadvantages and to provide for electrode operation in electrochemical devices in a more efficient and economical manner, utilizing a greater surface of electrode for the desired reaction, as well as much higher temperatures and pressures than were possible heretofore.

Other and further objects of the invention will become apparent from a study of the within specification and accompanying drawings in which.

Figure 1:
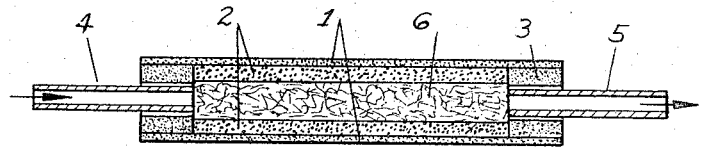
FIG. 1 is a schematic sectional view of an embodiment of a multiple layer electrode in accordance with the invention.

It has been found in accordance with the present invention that an efficient and economical multiple layer electrode may be provided which comprises a central porous gas distribution layer portion, an intermediate catalytically active porous working layer portion covering the gas distribution layer portion and being connected thereto, and a peripheral porous surface layer portion covering the working layer portion and being connected thereto. The surface layer portion is provided with an average pore radius which is smaller than the average pore radius of the working layer portion. In order to facilitate operation of the electrode, opposed inlet and outlet means are provided for supplying gaseous material through the inlet means to the gas distribution layer portion for distribution to the working layer portion therewithout and in turn for discharging residual gases material through the outlet means from said gas distribution layer portion.

In accordance with one embodiment of the invention, the gas distribution layer portion possesses a smaller resistance to flow for gases than the working layer portion so that suitable diffusion of the gaseous material may take place between the two layer portions.

Significantly, in accordance with the invention, the surface layer portion should be made of catalytically inactive material and the surface layer portion should cover the catalytically active working layer portion at least to an extent that ion communication with the working layer portion in an electrolyte is possible only through the pores of the surface layer portion. In this connection, the pores of the surface layer may have an average pore radius, for example within the range of from 0.1–100 microns.

The catalytically active working layer portion preferably contains a metal selected from the group consisting of groups Ib and VIII of the Periodic Table of Elements, including silver, nickel, platinum, palladium, and also copper, iron, cobalt, ruthenium, rhodium, etc. in Raney form. Generally the Raney metals used as active components of the Raney metal alloy may include metals from group eight, as well as the first, sixth, and seventh subgroups of the Periodic Table, i.e., copper, silver, gold, chromium, molybdenum, tungsten, manganese, rhenium, iron, cobalt, nickel, ruthenium, rhodium, palladium, osmium, iridum, and platinum. Palladized charcoal may also be a component of the catalytically active layer.

The Raney alloy may be used together with a carrier substance sufficient to form a sinterable powder mixture. Aluminum, magnesium, silicon and/or zinc may be used as the inactive alloying metal component with the particular Raney metal chosen, such that upon leaching treatment with caustic solution, such as 6 N potassium hydroxide, the inactive component is dissolved away, leaving a Raney metal double-skeleton catalyst electrode structure on the carrier material portion. The production of double-skeleton catalyst electrode structures is well known and may be carried out in accordance with the procedure disclosed in said U.S. 2,928,891 and with the procedure disclosed in copending application Ser. No. 781,140, filed Dec. 17, 1958, now abandoned, which latter application covers the specific preparation of double-skeleton catalyst electrodes containing Raney silver as active component.

The particle size of the Raney alloy material is generally below 100 microns and may range between 1 and 100 microns, although in some cases where fine and uniform pores are necessary, it is preferred to use a particle range of from about 5 to 8 microns.

The carrier material serves as the electrically conductive skeleton and is generally composed of carbonyl nickel or carbonyl iron within the above-mentioned particle range sizes, the carrier powder amounting to 90–20 percent by weight of the entire sinterable powder mixture while the Raney alloy portion amounts to from 10–80 percent by weight thereof. With respect to the Raney alloy itself, 20–80 percent by weight thereof, and preferably 40–60 percent is represented by the Raney metal active component, while 80–20 percent by weight and preferably 60–40 percent is represented by the inactive alloy component which is to be leached out by the subsequent activation treatment.

Electrodes of the foregoing kind may be used very well in electrolytes having a concentration of from 1–10 moles per liter and preferably, a potassium hydroxide solution of about 6 N.

Where the surface layer portion is composed of catalytically inactive material, such material must be resistant to action by the particular electrolyte used, yet be electrically conductive and sinterable so as to form a sure connection with the underlying catalytically active working layer portion.

Thus, the present invention provides a multiple layer electrode for the electrochemical generation of energy even from reducible and oxidizable reaction materials, such materials being capable of reacting on catalytically active electrodes without current to form at least one gaseous and electrochemically convertible component, the electrode actually comprising a central porous gas distribution layer, an intermediate catalytically active porous working layer completely outwardly covering the gas distribution layer and being tightly bonded thereto and a peripherally catalytically inactive porous surface layer completely outwardly covering the working layer and being tightly bonded thereto. As aforesaid, the surface layer should cover the working layer to such an extent that ion communication with the working layer in an electrolyte is possible only through the pores of the surface layer. The surface layer will naturally have an average pore radius smaller than that of the working layer at any point, yet greater than zero in at least a part of the surface layer. Conveniently, opposed inlet and outlet means are provided for supplying gaseous material through the inlet means to the gas distribution layer and in turn for discharging residual gaseous material through the outlet means from said gas distribution layer.

The layers are tightly bonded to one another by a particular method of pressing and sintering wherein each layer is separately formed from fine powder of the required size by pressing and the next outer layer is fixed thereto by pressing and then the preformed structure is finally fixed by sintering to form the porous multi-layered structure. For this purpose, pressures of from 1000 to 7000 kg./cm.$^2$ may be used, as well as sintering temperatures of from 100 to 1100° C., depending upon the sintering point of the particular metal ingredients involved and the sintering method.

In accordance with a particular embodiment of the invention the working layer will have a double-skeleton catalyst structure with Raney metal granules embedded in an electrically conductive supporting material while the surface layer is provided of pressed and sintered fine metallic powder, such as a powder of the same metal as the active component of the Raney alloy used.

The multiple layer electrode of the invention may take the form of a rectangular structure suitable for immersion in an electrolyte for the electrochemical generation of energy from reducible and oxidizable reaction materials wherein the gas distribution layer is centrally disposed between a pair of intermediate porous working layers completely outwardly covering the gas distribution layer and being bonded thereto to form a composite catalytically active porous inner zone. A pair of peripheral inactive porous surface layers are provided for correspondingly completely outwardly covering the working layers, said surface layers being tightly bonded to the underlying working layers and said surface layers having an average pore radius smaller than that of the working layers therebeneath. The surface layers, by their porous configuration and composition, form a catalytically inactive porous outer zone for enclosing the catalytically active inner zone. It will be appreciated that the surface layers can be defined by a pair of congruent parallel-plane porous plates which are connected to the corresponding working layers first by pressing and eventually sintering the composite pressed body, the exposed layer edges being encompassed by a frame which extends in clamping engagement with the plates in a manner sufficient to cover the intervening working and gas distribution layer portions thereat.

In the electrode structures in accordance with the invention, the gas distribution layer is preferably provided with capillary conduit means for connecting the inlet and outlet means with one another through the gas distribution layer. For this purpose, tubes may pass through the frame for communication with the gas distribution layer, these tubes not only serving as inlet and outlet means, but also as electrical conductors for the passage of electrical charges to the cell in the case of electrolysis and from the cell in the case of fuel cell operation.

Advantageously, by enclosing the catalytically active porous inner zone completely within the fine-pored surface layer and by connecting firmly the comparatively coarse-pored inner zone with the fine-pored surface layer through pressing and sintering, an electrode structure is achieved which may be used as a gas diffusion electrode in fuel cells for electrochemical conversion of gaseous materials, such electrode being sufficiently mechanically resistant to avoid fracture or otherwise, even at higher temperatures and pressures. The electrode structure is simply and readily produced with a minimum of steps, and due to the plate configuration thereof, the electrode may be operated as a double-sided electrode with the entire surface layer in contact with the electrolyte rather than just one face as is the case with the so-called valve electrodes interposed as a partition wall between the electrolyte space and the gas space.

Although the surface layer is comparatively finely pored, the catalytically active working layer and preferably the gas distribution layer should be coarsely pored.

The frame clampingly engaging the various layers along the corresponding periphery of the electrode body may consist of the same material as that of the surface layer portion or a different material therefrom and can possess the same or a different degree of porosity, so long as the pores in the frame, just as in the surface layer portion, will always be finer than the pores of the porous inner zone. The frame will always be denser and more finely porous than the working layer portion and gas distribution layer portion of such inner zone.

The particular metal selected for the frame, surface layer portion and working layer portion will depend upon the type of gaseous material to be electrochemically converted or to be developed at the electrode, the particular electrolyte used and the temperature and other operating conditions involved.

Where the electrode is used in a fuel cell arrangement, the gas is conducted to the electrode through the suction tube into the coarse-pored gas distribution layer whereupon such gas is uniformly distributed to the working layer for electrochemical conversion. The remaining inert portion of the gas not consumed in the electrical energy generation is forced by the entering gas through the electrode so that the same will be exhausted through the outlet tube.

It will be appreciated that in large electrodes the decrease in pressure which occurs within the electrode interior can become rather high during the travel of the gas from the suction inlet nozzle through the gas distribution layer of the electrode and to the inert gas exhaust in spite of the provision for a coarse-pored gas distribution layer. To avoid any such great decrease in pressure within the electrode, it is possible to provide a conventional system of capillary tubes in the coarsely-pored gas distribution layer so that the gas entering through the inlet tube must pass through the regular capillary system for uniform distribution and for leading off the inert portions of the gas which remain after consumption of the combustible portion thereof.

Referring to FIG. 1, an electrode structure in accordance with the invention is shown, including outer surface layers 1 completely enclosing therewithin the catalytically working layers 2, which in turn enclose the gas distribution layer 6. Gas distribution layer 6 is, of course, firmly bonded to the working layers 2, and the working layers 2 in turn are firmly bonded to the surface layers 1. A frame 3 is clamped along the periphery of the layers to cover the otherwise exposed layer edges, and inlet tube 4 and discharge tube 5 are provided in frame 3 which extend into the gas distribution layer 6. It will be appreciated that combustible gaseous material passes in the direction of the arrows through tube 4 into the gas distribution layer 6 and the remaining inert gas is exhausted through outlet tube 5 in the desired manner. By providing tubes 4 and 5 of electrically conductive material, current may be conducted to and/or from the electrode in an efficient manner.

Figure 2:
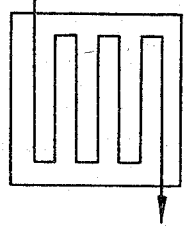
FIGS. 2 and 3 represent schematic illustrations of path configurations of the gaseous material through the central gas distribution layer portion.
Figure 3:
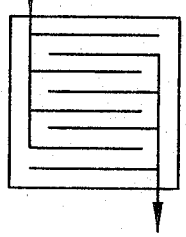

In FIGS. 2 and 3 suitable pattern arrangements of capillary tube systems are schematically shown, such systems being present in the electrode interior, i.e. within the coarse-pored gas distribution layer 6 of FIG. 1.

In the embodiment of FIG. 2, the capillary conduit passes back and forth along the extent of the gas distribution layer so as to permit simple and uniform distribution of the gaseous material to the adjacent working layers. In FIG. 3, an inlet network of separate conduit branches is provided intermeshed with a similar network of outlet branches, the gas passing from an inlet branch to an outlet branch through the coarse-pored gas distribution layer itself. The embodiment of FIG. 2 has the advantage that an inner decrease in pressure is significantly avoided whereas the advantage with the embodiment of FIG. 3 is that the gas distribution of gaseous materials containing a high content of impurities and inert materials may be effectively accommodated without blocking the pores of the working layer. This is true since the positioning of the inlet and outlet branches is such that the gaseous material must be dispersed throughout the gas distribution layer in order to pass from the inlet to the outlet side. Pockets of impure inert gaseous material will be minimized with this branch capillary configuration.

The gas distribution layer provided in the multi layer electrode completes several tasks: mechanically it holds together the working layers and avoids the buckling of the electrode at elevated gas pressures.

Because of its coarse structure it offers a comparatively slight resistance to the gas so that at smaller electrodes, within the gas conducting layer, a drop in pressure between the gas inlet and gas outlet may scarcely be ascertained compared with the hitherto known executions. By this more uniform distribution of pressure the electrolyte does not penetrate the pores of the working layers, even in the proximity of the gas outlet, whereby a "sinking" or flooding of parts of the electrode is avoided.

The coarse cell structure of the gas distribution layer favors furthermore the formation of convective gas currents, whereby from certain gas velocities on, which may easily be ascertained by tests, inert gas cushions are sucked off.

In larger size electrodes the drop in pressure within the electrode can become rather high on the way to the suction nozzle-inert gas exhaust in spite of the coarse cell gas distribution layer. To avoid this it is possible to provide a regular system of capillary tubes in a known way, which must be flowed through by the gas being led to the electrode.

It will be appreciated that production of electrodes in accordance with the invention is rendered different due to the fact that the different powder mixtures are not readily distinguished from one another through parallel planes as is the case with conventional electrodes. The material used for the various layers and the frame cannot be filled into the mold in the desired ordinal sequence and thereafter be simply pressed and sintered simultaneously, as was possible with previous double-skeleton catalyst electrodes of a particular type.

Likewise, it is is not possible to produce separately all the parts making up the electrode layers and then to combine them in a subsequent step of molding and sintering, since an electrode would be obtained in this manner which would not possess the stability desired at the communicating surfaces or interface between the various parts or layers. An electrode made in this manner in the form of a double-skeleton catalyst electrode would break down during the activation or during the subsequent operation thereof, in particular at those places where the respective layers were connected to one another. Cracks and breaks would appear along these connecting portions through which gases could objectionably escape into the electrolyte, thus reducing the efficiency of the electrode, and through which liquid electrolyte could enter the electrode, thus drowning the electrode in the sense that the pores would be completely filled with liquid electrolyte to the exclusion of gaseous material whereby the desired three phase interface of electrolyte, catalyst and gas would be objectionably diminished.

Conveniently, the indispensably required close connection between the various parts or layers of the electrode may be effected by molding such parts in a particular order. Thus, one layer which has been formed already is then pressed together with a powder mixture representing the next adjacent layer to be formed. In this manner, the solid layer is pressed into contact with the powder layer whereby sufficiently firm bonding of the powder particles with the already formed solid layer is achieved simultaneously with the bonding of these particles with one another to form the new layer.

In order to provide the above-mentioned capillary system for the gaseous material in the interior of the electrode, various procedures may be used, a most effective one being to embed conduit forming materials within the gas distribution layer powder material and then conducting the pressing and sintering operation. Suitably, the temperature and pressure conditions of the pressing and sintering are sufficient to remove the material used to form the capillary conduits. In some cases, while the capillary forming material will not break down during the pressing and sintering, such material will break down and be removed to produce the capillary conduits by the subsequent electrode activation as for example is carried out with caustic solution (6 N KOH). In the latter instance, the capillary forming material may be made of the same material as the inactive component of the Raney alloy. Obviously the pressing and sintering operations will serve to solidify and strengthen the electrode, but in no case will this treatment adversely affect the conduit forming material or the conduit formation.

Preferably, solid salts, as well as metallic wires, may be selected to form the capillary conduits where the electrodes are being made from double-skeleton catalyst materials. Such salts and metallic wires which may be used are those which may be eliminated by the treatment with acid or alkali during the conventional electrode activation, i.e., following the pressing and sintering operations. In addition to the foregoing materials which may be dissolved out during the activation, conduit forming materials may be used which may be evaporated at the sintering temperature used, these materials including, for example, citric acid, ammonium carbonate, and the like. Various procedures for forming capillary conduits of the instant type are disclosed in U.S. 2,860,175, issued Nov. 11, 1958.

Advantageously, in accordance with the invention, the electrode structure does not need an auxiliary or complementary mounting or enclosure of plastic material as in the past in order to frame the same in the cell device being used, and, of course, no bending or breaking of the electrode body will occur, even at elevated gas pressures, since all of the various parts of the multiple layer electrode are sintered firmly together. Of course, the delivery of current from the electrode, or the passage of current to the electrode in the case of electrolyzers, is able to be effected without the need for additional conducting parts since the metal tubes which serve as inlet and outlet conduits for the gaseous material may simultaneously serve this purpose. Significantly, due to the particular electrode construction, each small volume of gas must penetrate and permeate the inner zone before the same can reach the inert gas exhaust outlet, and in this way the formation of inert gas cushions in the electrode pores will be obviated.

The following example is set forth for the purpose of illustrating the manner of producing an electrode having a multiple layer structure in accordance with the invention, and it is to be understood that the example is set forth by way of illustration and not limitation.

*Example*

The mold device used for production of the electrode nucleus, as shown in FIGS. 4 to 8, consists of press cylinder 11 having a diameter of 43 mm. and being closed by a bottom ground plate 12. In the hollow space of the cylinder 11 a second cylinder 13 is closely embedded within which a pressure stamp 14 can be moved.

Figure 4:
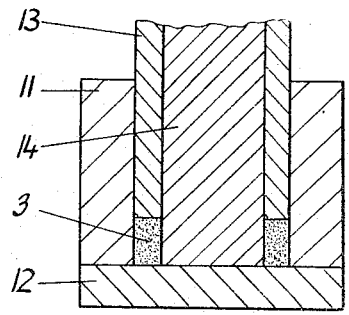
FIGS. 4 to 8 are schematic sectional views of a mold arrangement which may be used to form the various layer portions of the electrode in accordance with the invention.
Figure 5:
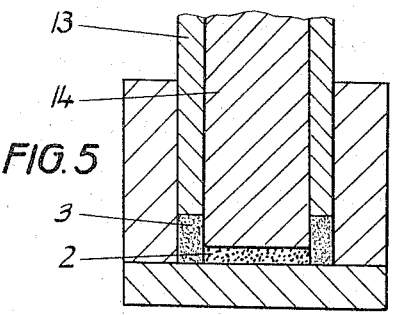

To produce an electrode structure the cylinder 13 having a wall thickness of 4 mm. was withdrawn from the hollow space. In the annulus between cylinder 11 and the pressure stamp 14, 14 g. of carbonyl nickel with a particle diameter of about $5\mu$ were filled in. Thereupon the carbonyl nickel powder was pressed in with the aid of the cylinder 13 while applying a pressing force of 200 kg./cm.² so that—as shown in FIG. 4—the ring 3 resulted, forming the frame part for the electrode. The pressure stamp 14 was next withdrawn and 5 g. of a double-skeleton-catalyst-powder-mixture filled in for forming the working layer 2. This intimate mixture consists of 2 g. of a finely powdered Raney alloy (grain size 35 to $50\mu$), which is produced of equal parts by weight of nickel and aluminum and of 3 g. carbonyl nickel powder.

Figure 6:
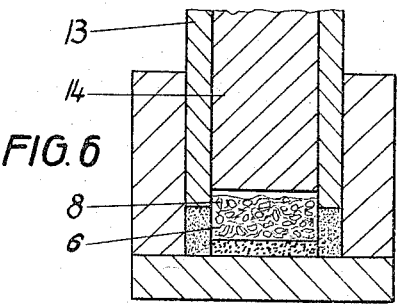

This layer was slightly pressed by hand with the pressure stamp 14 (see FIG. 5), and then the material for the gas distribution layer 6 was filled in consisting of an intimate mixture of 9 g. of carbonyl nickel powder with 4 g. of potassium chloride crystals 8 of the grain size of 200 to $400\mu$, as indicated in FIG. 6.

This layer 6 was also stiffened by a slight pressure before another 5 g. of the above mentioned mixture for the working layer 2 was applied and uniformly distributed.

Subsequently the pressure stamp 14 was loaded so heavily until the nucleus of the electrode showed the same height as the external ring 3 produced by carbonyl nickel powder. For this a pressure of 680 kg./cm.² was required.

Figure 8:
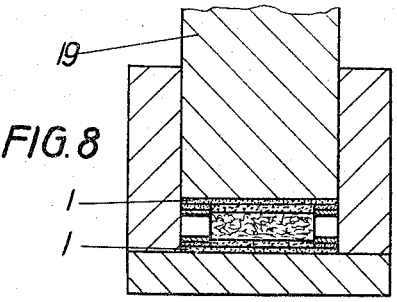

After removing the bottom ground-plate 12 the nucleus of the electrode enclosed by frame 3 was pushed out of the mold by the pressure stamps 13 and 14 and then—as shown in FIG. 8—embedded into a mold of the same diameter, the bottom of which was covered uniformly with a powder layer 1 for the surface layer which was made up of an intimate mixture of 4 g. of carbonyl nickel powder with a grain diameter of 7.5 to 9μ.

Having incorporated the electrode nucleus with frame 3 the same kind of powder layer 1 as mentioned above, was applied on and likewise uniformly distributed over the surface of the corresponding working layer 2 thereat to form the other surface layer 1. Thereupon the entire body was stiffened by the pressure stamp 19 with a pressing force of 3000 kg./cm.$^2$ at a temperature of 370° C., and subsequently sintered in a hydrogen atmosphere for 12 min. at a temperature of 820° C.

In order to use the electrode in a fuel cell the frame 3 of the electrode was provided with bores in the central plane of the gas distributing layer and on two opposite points. Tubes were installed, and the interspace between frame and tubes was cast with a synthetic resin capable of being hardened.

The activation of the electrode needed only about ⅕ of the time which was necessary heretofore when a 5 N caustic solution was circulated also through the tubes provided for the gas distribution.

Figure 7:
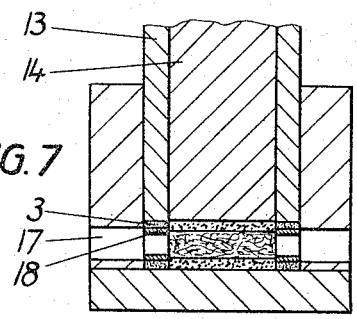

It is possible to prepare the recesses necessary for inlet and outlet of the gases in the frame 3 during the electrode production. One such proposition is shown in FIG. 7.

The cylinder 11 contains in the central plane of the gas distributing layer preferably two channels 17 opposite to each other which are maintained closed by suitable ground stoppers until the nucleus of the electrode is completed. Thereafter the stoppers are removed, holes are bored through the channels 17 into frame 3 and subsequently casings 18 of the thickness of the frame are inserted, such casings having a diameter corresponding to the thickness of the gas distribution layer thereat.

As shown in FIG. 8 the electrode body provided with casings may further be operated without difficulties.

If gas inlet and outlet tubes in the length provided for, should at once be embedded this may be attained by providing cylinder 11 in the plane vertical to its axis likewise in the central plane of the electrode frame 3 with channels 17 for accommodating the tubes and by separating the cylinder in this plane. Both portions are held together by screws. As aforesaid appropriate holes are perforated in the frame and the tubes inserted. After fixing of the electrode by hot-pressing, the mold device is dismantled to remove the electrode with the cylinder 11 being likewise divided in two so the tubes now firmly connected with the electrode may together with the latter be removed.

Of course, it is possible to embed more than two tubes in other positions to one another but the above mentioned procedure is preferred. Suitably the external tube diameter is as large as the gas distributing layer thickness. Smaller tube diameters, also of differing size, may then be used preferably when more than two tubes are present.

For the gas conducting—or gas distribution—layer 6 a number of materials are usable as starting material; they must, however, fulfill two basic conditions:

(1) The materials must be sinterable under the conditions of the electrode production, as only thereby the electrode obtains the inner stability which also permits the application of higher gas pressures.

(2) The material must be selected in a manner that the gas conducting layer of the completed electrode possesses pores which are larger than those of the two adjacent, catalytically active layers.

The first condition is satisfied by using comparatively ductile metals or metal alloys. The desired porosity—without considerable loss of stability—is obtained by producing the capillary systems represented in FIGS. 2 and 3 in the gas conducting layer or by taking a corresponding coarse powder or, by mixing fine powder with coarse-grained, subsequently removable material. It is, of course, possible to carry out several of the shown steps simultaneously. Preferably salts should be selected as removable materials which do not decompose during the sintering or pressing procedure at elevated temperatures, but are soluble in water, acids or lyes. If capillary systems should be produced in the gas conducting layer to decrease the pressure drop which is above all for larger electrodes of importance, the wires of such metals may be used which, after the finishing of the electrode may likewise be dissolved out by acids or lye. Since the catalytically active working layers must first be activated by removing the inactive alloying component, it would be preferable to insert such metallic wires which may be dissolved under the same conditions as for instance, wires of zinc, aluminum and magnesium.

Moreover it is possible to elevate the degree of porosity of the gas distribution layer by taking materials which evaporate at the sintering temperatures. To such materials belong the above mentioned citric acid as well as nearly all ammonium salts of organic compounds.

The great advantage obviously for the electrodes provided with the gas distribution layer according to the invention does not only exist in that a more uniform distribution of the reaction gases in the interior of the electrode is possible but that now gases of a comparative high inert gas portion, for instance 10% of the gas volume and more, can be used for the operation of fuel cells which is of great economical importance.

At perfect conduction of the reaction process which may be ascertained by a simple test for a certain kind of electrodes it is possible to consume all gases which are able to react, in the electrode; only the inert gas portion escapes than from the gas outlet.

Figure 9:
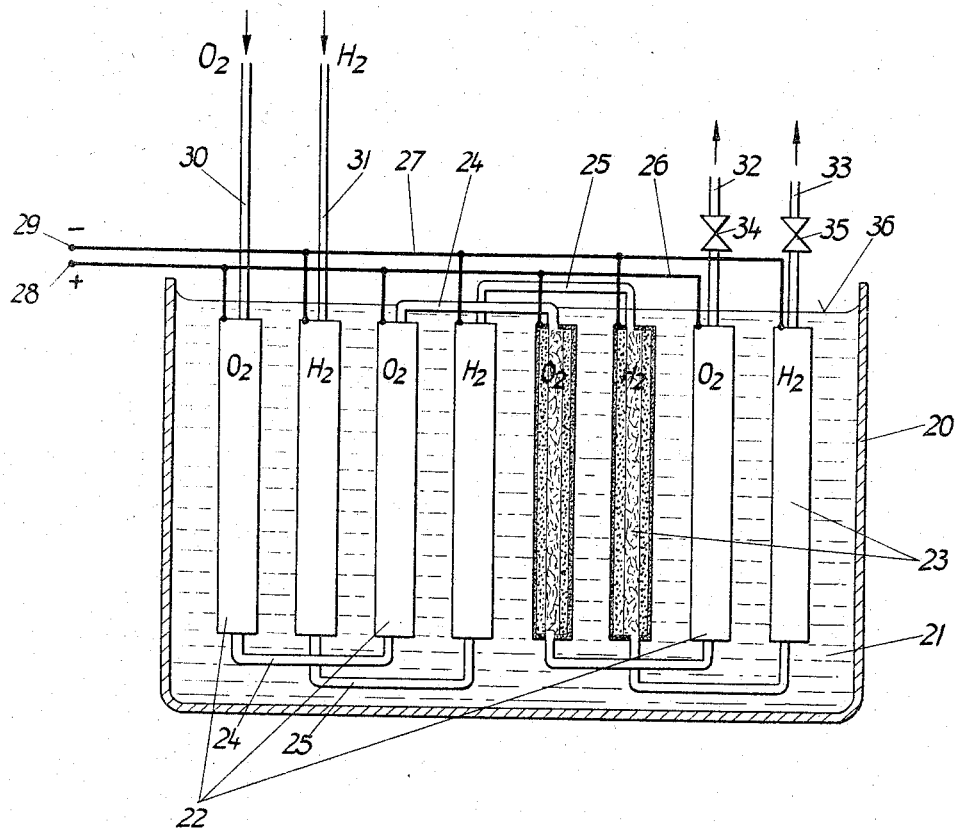
FIG. 9 is a schematic sectional view of a fuel cell with electrodes according to the invention.

This directing of the reaction is of course important only for the operation of single cells; the situation is different if more than one kind of electrode is used in a fuel cell. FIG. 9 represents schematically such a configuration for an oxyhydrogen element. In the container 20 oxygen electrodes 22 and hydrogen electrodes 23 surrounded by electrolyte 21 are present. The gases are conducted through gas inlet tubes 30 and 31 by means of bridging conduits 24 and 25 to a series of electrodes before the inert gas portion is removed of the electrodes, via the valves 34 and 35 through the gas outlets 32 and 33. The electrodes of different polarity are connected electrically in parallel with one another by attachment with the circuit terminal lines 26 and 27. A current utilization device (load) is connected to the poles 28 and 29. During the operation of such a fuel cell the duration of the gas within the electrode is of course fixed in a manner that the last of the reaction gas is consumed entirely only in the last electrode pair.

What is claimed is:

1. Multiple layer electrode which comprises a central metal particle porous gas distribution layer portion, an intermediate catalytically active metal particle porous working layer portion covering said gas distribution layer portion and being connected thereto, a peripheral catalytically inactive metal particle porous surface layer portion covering said working layer portion and being connected thereto, said central, intermediate and surface layer portions being in common pressed and sintered condition with the metal particles within each said layer portion being fused together at their points of contact and with the metal particles of one layer portion being fused together at their points of contact with the adjacent metal particles of the next adjacent layer portion, said surface layer portion having an average pore radius which is smaller than the average pore radius of said working layer portion, and opposed inlet and outlet means flow communicating with each other via said gas distribution layer portion for supplying gaseous material through said inlet means to said gas distribution layer portion for distribution to said working layer portion and in turn for discharging residual gaseous material through said outlet means from said gas distribution layer portion.

2. Electrode according to claim 1 wherein said gas distribution layer portion has a smaller resistance to flow for gases than said working layer portion.

3. Electrode according to claim 1 wherein said surface layer portion covers said working layer portion at least to an extent that ion communication with said working layer portion in a liquid electrolyte is possible only through the pores of said surface layer portion, the pores of said surface layer portion having an average pore radius within the range of from 0.1 to 100 microns.

4. Electrode according to claim 3 wherein said working layer portion contains a metal selected from the group consisting of Groups Ib and VIII of the Periodic Table of Elements.

5. Electrode according to claim 3 wherein asid working layer portion contains nickel.

6. Electrode according to claim 3 wherein said working layer portion contains silver.

7. Electrode according to claim 3 wherein said working layer portion contains nickel and silver.

8. Electrode according to claim 1 wherein said working layer portion has a double-skeleton catalyst structure with from 20 to 80 percent by weight of Raney metal granules being embedded in from 80 to 20 percent by weight of electrically conductive supporting skeleton material.

9. Multiple layer electrode for the electrochemical generation of energy from reducible and oxidizable reaction materials which are capable of reacting on catalytically active electrodes which comprises a central metal particle porous gas distribution layer, an intermediate catalytically active metal particle porous working layer completely outwardly covering said gas distribution layer and being tightly bonded thereto, a peripheral catalytically inactive metal particle porous surface layer completely outwardly covering said working layer and being tightly bonded thereto, said central, intermediate, and surface layers being in common pressed and sintered condition with the metal particles within each said layer being fused together at their points of contact and with the metal particles of one layer being fused together at their points of contact with the adjacent metal particles of the next adjacent layer, said surface layer covering said working layer at least to an extent that ion communication with said working layer in a liquid electrolyte is possible only through the pores of said surface layer and said surface layer having an average pore radius which is smaller than the average pore radius of said working layer at any point and greater than zero in at least a part of said surface layer while said distribution layer has an average pore radius which is larger than the average pore radius of said working layer, and opposed inlet and outlet means flow communicating with each other via said gas distribution layer for supplying gaseous material through said inlet means to said gas distribution layer for distribution to said working layer and in turn for discharging residual gaseous material through said outlet means from said gas distribution layer.

10. Electrode according to claim 9 wherein said layers are tightly bonded to one another by pressing one layer onto the next followed by pressing and sintering the layers simultaneously using a pressure of from 1000 to 7000 kg./cm.$^2$ and a temperature of from 100 to 1100° C., the working layer having a double-skeleton catalyst structure with Raney metal granules embedded in electrically conductive supporting skeleton material, and the surface layer being present in the form of pressed and sintered fine metallic powder of the same metal as the Raney metal active component of the Raney alloy used.

11. Multiple layer electrode for the electrochemical generation of energy from reducible and oxidizable reaction materials which are capable of reacting on catalytically active electrodes, which comprises a central catalytically active metal particle porous gas distribution layer disposed between a pair of intermediate catalytically active metal particle porous working layers, said working layers completely outwardly covering said gas distribution layer and being tightly bonded thereto to form a composite catalytically active porous inner zone, said gas distribution layer having an average pore radius which is larger than the average pore radius of said working layers, and a pair of peripheral catalytically inactive metal particle porous surface layers correspondingly completely covering said working layers and being tightly bonded thereto, said central, intermediate, and surface layers being in common pressed and sintered condition with the metal particles within each said layer being fused together at their points of contact and with the metal particles of one layer being fused together at their points of contact with the adjacent metal particles of the next adjacent layer, said surface layers having an average pore radius which is smaller than the average pore radius of said working layers at any point and greater than zero in at least a part of said surface layers and said distribution layer having an average pore radius which is larger than the average pore radius of said working layer, said surface layers forming a catalytically inactive porous outer zone enclosing said catalytically active porous inner zone at least to an extent that ion communication with said inner zone in a liquid electrolyte is possible only through the pores of said outer zone, and opposed inlet and outlet means flow communicating with each other via said gas distribution layer for supplying gaseous material through said inlet means to said gas distribution layer for distribution to said working layers and in turn for discharging residual gaseous material through said outlet means from said gas distribution layer.

12. Electrode according to claim 11 wherein said surface layers are defined by a pair of congruent, parallel-plane porous plates, said plates being connected to the corresponding working layers by pressing and sintering, and a frame having an average pore radius which is at most smaller than the average pore radius of said working layers and said distribution layer is disposed around the peripheries of and extending in clamping engagement with the plates to cover the intervening working and gas distribution layer portions thereat, said gas distribution layer being provided with capillary conduit means communicating said inlet and outlet means through said gas distribution layer.

13. Electrode according to claim 12 wherein said inlet and outlet means communicate with said gas distribution layer through said frame, said inlet and outlet means being defined by electrically conductive tubes passing into opposing portions of said gas distribution layer through corresponding opposing portions of said frame.

14. Electrode according to claim 13 wherein said working layer has a double-skeleton catalyst structure with Raney metal granules embedded in electrically conductive supporting skeleton material, and said surface layers and frames are present in the form of pressed and sintered fine metallic powder of the same metal as the Raney metal active component of the Raney alloy used.

15. In a fuel cell containing a solution including an electrolyte and a reaction substance capable of being converted electrochemically, the improvement which comprises a multiple layer electrode body at least a portion of which is disposed in said solution having a central metal particle porous gas distribution layer, an intermediate catalytically active metal particle porous working layer completely outwardly covering said gas distribution layer and being tightly bonded thereto, and a peripheral catalytically inactive metal particle porous surface layer completely outwardly covering said working layer and being tightly bonded thereto, said central, intermediate, and surface layers being in common pressed and sintered condition with the metal particles within each said layer being fused together at their points of contact and with the metal particles of one layer being fused together at their points of contact with the adjacent metal particles of the next adjacent layer, said surface layer covering said working layer at least to an extent that ion communication with said working layer in a liquid electrolyte is possible only through the pores of said surface layer and said surface layer having an average pore radius which is smaller than the average pore radius of said working layer at any point and greater than zero in at least a part of said surface layer, and opposed inlet and outlet means flow communicating with each other via said gas distribution layer for supplying gaseous material through said inlet means to said gas distribution layer for distribution to said working layer and in turn for discharging residual gaseous material through said outlet means from said gas distribution layer.

16 In the process of producing a multiple layer electrode by pressing and sintering fine metal powders to form the respective layers, the improvement which comprises first pressing powder material for forming a peripheral frame for the electrode, then adding in the center of the frame powder for a first working layer and pressing such first working layer powder thereat, then adding powder for a gas distribution layer onto the surface of the already pressed working layer, then pressing such gas distribution layer powder in contact with the already pressed first working layer, then adding powder for a second working layer onto the corresponding surface of the already pressed gas distribution layer, then pressing such second working layer powder in contact with the already pressed gas distribution layer, the two working layers and gas distribution layer being of a total thickness at least as small as the thickness of said frame, then adding a powder for a respective surface layer onto each corresponding surface of the already pressed working layers covering the gas distribution layer therebetween, and pressing and sintering the surface layer powders in contact with the corresponding already pressed working layers having the gas distribution layer therebetween, whereby to form a composite multilayered electrode having the particles of the respective layers bonded to one another at the contact points therebetween and bonded to the next adjacent layer at the contact points of particles in one layer adjacent particles in the next layer.

17. Multiple layer gas diffusion electrode which comprises a central porous gas distribution layer of pressed metal particles, an intermediate catalytically active porous working layer of pressed catalyst metal particles covering said gas distribution layer and being connected thereto, a peripheral porous catalytically inactive surface layer of pressed metal particles covering said working layer and being connected thereto, the particles of said surface layer being of a different material from that of the particles of said working layer and said central, intermediate and surface layers being connected correspondingly by pressing and sintering simultaneously said layers in contact with one another to bond together the pressed particles within each layer at their points of contact and to bond together the pressed particles of one layer with the pressed particles of the next adjacent layer at their points of contact, said surface layer covering said working layer at least to an extent that ion communication with said working layer in an electrolytic liquid is possible only through the pores of said surface layer and said surface layer having an average pore radius which is smaller than the average pore radius of said working layer at any point and greater than zero in at least a part of said surface layer while said distribution layer has an average pore radius which is larger than the average pore radius of said working layer, and opposed inlet and outlet means flow communicating with each other via said gas distribution layer for supplying gaseous material through said inlet means to said gas distribution layer for distribution to said working layer and in turn for discharging residual gaseous material through said outlet means from said gas distribution layer.

References Cited by the Examiner

UNITED STATES PATENTS

| | | | |
|---|---|---|---|
| 2,928,891 | 10/1955 | Justi et al. | 136—86 |
| 2,947,797 | 8/1960 | Justi et al. | 136—120 |
| 3,077,508 | 2/1963 | Oswin | 136—121 |
| 3,101,285 | 8/1963 | Tantram et al. | 136—120 |
| 3,220,937 | 11/1965 | Friese et al. | 136—86 X |
| 3,256,163 | 6/1966 | Winsel et al. | 136—86 X |

FOREIGN PATENTS

| | | |
|---|---|---|
| 848,586 | 9/1960 | Great Britain. |
| 871,950 | 7/1961 | Great Britain. |

OTHER REFERENCES

Mitchell, W.: Fuel Cells, Academic Press, New York, 1963 (page 103 relied on).

WINSTON A. DOUGLAS, *Primary Examiner.*

JOHN H. MACK, *Examiner.*

W. VAN SISE, N. P. BULLOCH, *Assistant Examiners.*